United States Patent
Roeland et al.

(10) Patent No.: US 11,765,094 B2
(45) Date of Patent: Sep. 19, 2023

(54) COMMUNICATION SYSTEM WITH DE-JITTER BUFFER FOR REDUCING JITTER

(71) Applicant: Telefonaktiebolaget LM Ericsson (publ), Stockholm (SE)

(72) Inventors: Dinand Roeland, Sollentuna (SE); Göran Eriksson, Norrtälje (SE); Kun Wang, Solna (SE); Mona Matti, Nacka (SE); Jaeseong Jeong, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/413,067

(22) PCT Filed: Nov. 15, 2019

(86) PCT No.: PCT/SE2019/051166
§ 371 (c)(1),
(2) Date: Jun. 11, 2021

(87) PCT Pub. No.: WO2020/122782
PCT Pub. Date: Jun. 18, 2020

(65) Prior Publication Data
US 2022/0045962 A1  Feb. 10, 2022

Related U.S. Application Data

(60) Provisional application No. 62/778,700, filed on Dec. 12, 2018.

(51) Int. Cl.
*H04L 47/283* (2022.01)

(52) U.S. Cl.
CPC .................... *H04L 47/283* (2013.01)

(58) Field of Classification Search
CPC ............ H04L 47/283; H04L 47/286; H04L 29/08945; H04L 29/08963; H04L 41/06; H04L 41/064; H04L 41/0622; H04L 41/0836; H04L 41/5009; H04L 41/28; H04L 41/562; H04L 41/564;
(Continued)

(56) References Cited

U.S. PATENT DOCUMENTS 6,195,333 B1 * 2/2001 Wise .................. H04L 49/3081
370/238.1
9,674,104 B1 * 6/2017 Pan ........................ H04L 47/283
(Continued)

OTHER PUBLICATIONS

International Search Report and Written Opinion dated Feb. 12, 2020 in International Application No. PCT/SE2019/051166 (9 pages total).

*Primary Examiner* — Thu Ha T Nguyen
(74) *Attorney, Agent, or Firm* — Rothwell, Figg, Ernst & Manbeck, P.C.

(57) ABSTRACT

A de-jitter function for holding-and-forwarding packets such that the packets are delivered with an agreed fixed latency. The de-jitter function can be placed at the edge of a virtual 5G TSN switch (e.g. the de-jitter function can be deployed as part of a UPF for uplink (UL) packets and/or it can be deployed as part of a user equipment (UE) for downlink (DL) packets). By using the de-jitter function, the TSN can consider the wireless network as having a consistent, deterministic latency with no jitter.

20 Claims, 7 Drawing Sheets

(58) Field of Classification Search
CPC . H04L 41/566; H04L 12/145; H04L 12/1453;
H04L 12/2859; H04L 12/2863; H04L
45/00; H04L 45/302; H04L 45/304; H04L
45/645; H04L 45/70; H04L 43/0852;
H04L 43/0876; H04L 43/0888; H04L
43/08; H04L 43/0858; H04L 47/28; H04L
47/29
USPC .................................................. 709/223, 224
See application file for complete search history.

(56) References Cited

U.S. PATENT DOCUMENTS

| | | | | |
|---|---|---|---|---|
| 10,084,665 | B1* | 9/2018 | Arunachalam | H04L 41/22 |
| 10,594,423 | B1* | 3/2020 | Anand | H04L 69/22 |
| 10,680,742 | B2* | 6/2020 | Zhao | H04L 12/1845 |
| 10,869,032 | B1* | 12/2020 | Shen | H04N 21/234327 |
| 11,469,970 | B2* | 10/2022 | Coleman, Jr. | G06F 21/33 |
| 2005/0083938 | A1* | 4/2005 | Newson | H04L 1/205 |
| | | | | 370/519 |
| 2005/0254440 | A1* | 11/2005 | Sorrell | H04L 65/1101 |
| | | | | 348/14.08 |
| 2006/0045139 | A1* | 3/2006 | Black | G10L 19/005 |
| | | | | 704/E19.003 |
| 2008/0084900 | A1* | 4/2008 | Dunn | H04L 43/062 |
| | | | | 375/E7.014 |
| 2008/0186998 | A1* | 8/2008 | Rijpkema | H04L 45/40 |
| | | | | 370/458 |
| 2014/0082146 | A1* | 3/2014 | Bao | H04L 69/22 |
| | | | | 709/219 |
| 2014/0369329 | A1* | 12/2014 | Lee | H04L 47/41 |
| | | | | 370/338 |
| 2015/0092585 | A1* | 4/2015 | Shao | H04L 47/283 |
| | | | | 370/252 |
| 2015/0172154 | A1* | 6/2015 | Wong | H04L 43/087 |
| | | | | 370/244 |
| 2015/0281025 | A1* | 10/2015 | Wallbaum | H04L 43/062 |
| | | | | 370/252 |
| 2015/0341812 | A1* | 11/2015 | Dion | H04N 21/6373 |
| | | | | 370/252 |
| 2016/0028882 | A1* | 1/2016 | Assem | H04M 3/2236 |
| | | | | 370/252 |
| 2016/0142840 | A1* | 5/2016 | Das | H04L 49/9026 |
| | | | | 381/83 |
| 2016/0295539 | A1* | 10/2016 | Atti | H04L 43/087 |
| 2016/0345219 | A1* | 11/2016 | Brisebois | H04W 36/023 |
| 2017/0063704 | A1* | 3/2017 | Krinsky | H04W 4/029 |
| 2017/0111856 | A1* | 4/2017 | Rajendran | H04L 65/80 |
| 2017/0201443 | A1* | 7/2017 | Sung | H04L 43/0835 |
| 2017/0215056 | A1* | 7/2017 | Edge | H04L 1/00 |
| 2017/0303159 | A1* | 10/2017 | Ma | H04W 74/0808 |
| 2018/0063008 | A1* | 3/2018 | Hammarqvist | H04L 43/087 |
| 2018/0103471 | A1* | 4/2018 | Kharia | H04L 43/087 |
| 2018/0295050 | A1* | 10/2018 | Lee | H04L 43/087 |
| 2019/0037002 | A1* | 1/2019 | Arunachalam | H04L 43/0852 |
| 2019/0140964 | A1* | 5/2019 | Southworth | H04L 47/22 |
| 2019/0158371 | A1* | 5/2019 | Dillon | H04L 47/25 |
| 2019/0312815 | A1* | 10/2019 | Altman | H04L 43/0876 |
| 2019/0363976 | A1* | 11/2019 | Thubert | H04W 40/24 |
| 2019/0373041 | A1* | 12/2019 | Lee | H04L 43/087 |
| 2019/0379591 | A1* | 12/2019 | Boughzala | H04L 47/115 |
| 2020/0213204 | A1* | 7/2020 | Das | H04L 49/252 |
| 2020/0358858 | A1* | 11/2020 | Shribman | G06F 9/547 |
| 2020/0412659 | A1* | 12/2020 | Arditti Ilitzky | H04L 47/125 |
| 2021/0058812 | A1* | 2/2021 | Chai | H04W 28/0278 |
| 2021/0075736 | A1* | 3/2021 | Falk | H04L 65/604 |
| 2021/0112439 | A1* | 4/2021 | Leung | H04L 47/824 |
| 2021/0234919 | A1* | 7/2021 | Paralikar | H04L 67/563 |
| 2021/0250245 | A1* | 8/2021 | Li | H04W 24/04 |
| 2021/0258235 | A1* | 8/2021 | Peng | G06N 20/00 |
| 2021/0304026 | A1* | 9/2021 | Mermoud | H04L 45/58 |
| 2021/0356279 | A1* | 11/2021 | Szigeti | G01C 21/3407 |
| 2022/0045962 | A1* | 2/2022 | Roeland | H04L 41/145 |
| 2022/0046075 | A1* | 2/2022 | Li | H04L 43/062 |
| 2022/0060346 | A1* | 2/2022 | Sevindik | H04N 21/6118 |
| 2022/0103525 | A1* | 3/2022 | Shribman | H04L 63/0272 |
| 2022/0124543 | A1* | 4/2022 | Orhan | G06N 3/08 |
| 2022/0377019 | A1* | 11/2022 | Rao | H04L 47/6235 |
| 2023/0006889 | A1* | 1/2023 | Thyagaturu | H04L 41/5054 |

* cited by examiner

COMMUNICATION SYSTEM WITH DE-JITTER BUFFER FOR REDUCING JITTER

CROSS REFERENCE TO RELATED APPLICATIONS

This application is a 35 U.S.C. § 371 National Stage of International Patent Application No. PCT/SE2019/051166, filed Nov. 15, 2019, designating the United States, which claims priority to U.S. provisional patent application 62/778,700, filed on Dec. 12, 2018. The above identified applications are incorporated by this reference.

TECHNICAL FIELD

This disclosure relates to a communication system that employs a de-jitter buffer to reduce jitter.

BACKGROUND

Some communication devices (e.g., sensors, robots, controllers, etc.) used in some production process (e.g., in automated factories) are highly sensitive to network jitter (or jitter for short). Jitter is generally known as the variation in the delay of received protocol data units PDUs (e.g., IP packets, Ethernet frames, or (PDUs)). As used herein the term "packet" means a PDU. In some applications, packets are sent by a transmitting device in a continuous stream with the packets being spaced evenly apart (e.g. one packet is sent every 10 ms). Due to network congestion, improper queuing, or configuration errors, this steady stream of packets can become "lumpy" (i.e., the delay between each packet can vary instead of being 10 ms).

In a wireless communication system, causes of jitter include: a) radio coverage issues; b) radio capacity issues; and c) other connectivity network issues. Mobile communication devices associated with considerable amount of data can cause radio related jitter by blocking signals and/or overloading a radio link.

Today, wired industrial Ethernet solutions such as PROFINET® and EtherCAT® are mostly used in a factory floor to interconnect sensors, actuators, robots, and controllers in an automation system. Time-Sensitive Networking (TSN) is a set of standards under development by the Time-Sensitive Networking task group of the IEEE 802.1 working group. The TSN standards aim to provide technology that will be able to provide manufacturing industries with deterministic, guaranteed latencies, and extremely low packet loss services.

One of IEEE TSN standards, 802.1Qbv, can provide on-time delivery of TSN frames. It defines a means to transmit certain TSN Ethernet frames on a schedule. Because all network elements share the same time, end devices and bridges implementing Qbv can deliver critical communication very quickly and with no discernible jitter in delivery.

FIG. 1 illustrates how TSN can be integrated with a wireless network (e.g., a 3GPP network). In the example shown, the wireless network is a 3GPP 5G network comprising a 5G base station (gNB) 102 and a 5G user plane function (UPF) 104. The basic principle is that the wireless network is seen as a virtual TSN switch 106.

In some TSN deployments it is critical that messages arrive on-time (i.e., it is critical that the message neither arrive too early nor arrive too late). However, latency in a wireless network may have large variations from time to time due to several uncertainties in the network (e.g. radio channel conditions, network routing paths). For example, there may be a significant difference between the uplink maximal latency (e.g., 4.1 ms) and the downlink maximal latency (2.2 ms) due to the asymmetric characteristics from the radio system implementation. Additionally, the uplink and downlink latencies may have a large variation (e.g., from 0.33 ms to 4.1 ms for the uplink traffic and 0.33 ms to 2.2 ms for the downlink traffic).

SUMMARY

To compensate for the latency variations introduced by a wireless network, a de-jitter function can be deployed to hold-and-forward packets such that the packets are delivered with an agreed fixed latency of X ms. Generally, the de-jitter function can be placed at the edge of a virtual 5G TSN switch (e.g. the de-jitter function can be deployed as part of a UPF for uplink (UL) packets and/or it can be deployed as part of a user equipment (UE) for downlink (DL) packets). By using the de-jitter function, the wireless network can be considered as having a consistent, deterministic latency of X ms with no jitter.

In the de-jitter solution described above, the de-jitter function employs a de-jitter buffer that is used to hold received packets for a certain amount of time (a.k.a., packet hold time) so that the agreed fixed latency (a.k.a., "maximum packet-hold time" or "desired packet delay") is achieved and jitter is avoided (i.e., the spacing between packets is preserved such that the pace of outgoing packets can be made equal to the pace of incoming packets). Accordingly, for each received packet, the de-jitter function may delay the forwarding of the packet (i.e., not forward the packet immediately upon receiving the packet) so that the packet will have a total delay equal to the desired packet delay (i.e., the agreed fixed latency). The desired packet delay is a function of maximum latency (e.g., it is usually equal to or greater than the maximum latency that may occur when a packet is forwarded through the wireless network). The 3GPP conference paper R2-1814992 states: "For the TSN requirements evaluation in RAN, we only need to consider maximum allowable latency value and can disregard jitter." This means that the maximum packet-hold time (or desired packet delay) should be set based on the worst-case scenario (i.e., the maximum latency).

In a simple implementation, each UL packet will experience the same fixed delay regardless of the user equipment (UE) that transmitted the packet (or received the packet for DL packets). That is, the maximum packet-hold time can be the same for all packets regardless of the UE that transmitted/received the packet. However, it may very well be possible that the worst case occurs only for a single UE or a subset of the UEs. For example, at least some packets transmitted by a first UE may experience a greater delay than any packet transmitted by another UE due to the physical position of the first UE. Thus, it may be the case that, for a particular group of UEs, the radio channel between the UEs in the group and the serving base station has a good quality. Accordingly, UL packets transmitted from these UEs don't need to be held in the de-jitter buffer based on the worst-case scenario. The same may be the case for DL packets. Because holding a packet in a de-jitter buffer adds undesired and unnecessary latency to the overall communication system, it is desirable to minimize the amount of time a packet is held in a de-jitter buffer, while at the same time removing the jitter.

A solution to the problem above is to customize the maximum packet-hold time (agreed fixed latency) for each UE (or each group of UEs) rather than apply a single maximum packet-hold time for all UEs, thereby achieving a shorter latency for the UEs that do not need to be configured for the worst-case scenario (e.g., the UEs that experience a good radio channel quality). This customization of the maximum packet-hold-time can be achieved using machine learning to produce a model (e.g., a mathematical function, a table, etc.) that maps environment data for a UE to a maximum packet-hold-time, where the environment data for the UE may be in the form of a vector.

For example, a machine learning functionality can find patterns such that the maximum packet-hold time for each UE can be kept as low as possible. For example, all UEs in the left corner of a production facility may receive a good radio signal, which means that the risk for jitter is low for these UEs, and, consequently, the maximum packet-hold time for these UEs can be set to a lower value than the maximum packet-hold-time that is set for other UEs (e.g., UES in a different part of the facility) that do not experience such a good radio signal. An advantage is that the de-jitter function is "intelligent" because it does not simply set a default worst-case maximum packet-hold-time for all (or a group of) UEs. Another advantage of this is that memory consumption and energy consumption for the unit hosting the de-jitter function can be improved.

Accordingly, in one aspect there is provided a method that includes obtaining a model for use in mapping environment data to a maximum packet-hold time. The method also includes obtaining first environment data associated with a first user equipment (UE); and using the first environment data associated with the first UE and the model to obtain a maximum packet-hold time for the first UE (X1), wherein the maximum packet-hold time for the first UE (X1) enables a de-jitter function to determine how long to hold an UL or DL packet in a de-jitter buffer (e.g., an UL packet originating from the first UE or a DL packet received at the UE).

In some embodiments, the environment data associated with the first UE comprises location information identifying the current location of the first UE. In some embodiments, the UE is hosted in a device, and the environment data associated with the first UE further comprises device characteristic information indicating a characteristic of a device hosting the UE.

In some embodiments, the method also includes receiving, at time t1, a packet obtained by the first UE at time t0; storing the received packet in the de-jitter buffer; and after storing the packet in the de-jitter buffer, transmitting the packet at a predetermined time t that is based on the obtained maximum packet-hold time for the first UE (X1). In some embodiments, t=X1−(t1−t0) or t=t1+X1.

In some embodiments, the method also includes determining the value of t0 based on timing information contained in the packet or timing information transmitted with the packet.

In some embodiments, the method also includes obtaining second environment data associated with a second UE; and using the second environment data associated with the second UE and the model to obtain a maximum pack-hold-time for the second UE (X2).

In another aspect a method is provided that includes obtaining a maximum packet-hold time value for a first user equipment (UE), wherein the obtained maximum packet-hold time value for the first UE (X1) was determined based on environment data associated with the first UE and a model obtained by a supervised learning process. The method also includes receiving, at time t1, a packet obtained by an upstream device at time t0 (e.g., obtained by the first UE for UL packets or obtained by the UPF for DL packets); storing the received packet in a de-jitter buffer; and after storing the packet in the de-jitter buffer, transmitting the packet at a predetermined time t that is based on the obtained maximum packet-hold time value for the first UE (X1). In some embodiments, t=X1−(t1−t0) or t=X1+t1. In some embodiments, the method also includes determining the value of t0 based on timing information contained in the packet or timing information transmitted with the packet. In some embodiments, the environment data associated with the first UE comprises location information identifying the current location of the first UE. In some embodiments, the UE is hosted in a device, and the environment data associated with the first UE further comprises device characteristic information indicating a characteristic of a device hosting the UE.

In another aspect a computer program is provided. The computer program comprises instructions which when executed by processing circuitry causes the processing circuitry to perform any of the method described herein. In one embodiment there is provided a carrier containing this computer program. In one embodiment, the carrier is one of an electronic signal, an optical signal, a radio signal, and a computer readable storage medium.

In another aspect an apparatus is provided. In one embodiment the apparatus is adapted to obtain a model for use in mapping environment data to a maximum packet-hold time. The apparatus is further adapted to obtain first environment data associated with a first UE. The apparatus is further adapted to use the first environment data associated with the first UE and the model to obtain a maximum packet-hold time for the first UE, wherein the maximum packet-hold time for the first UE enables a de-jitter function to determine how long to hold an UL or DL packet in a de-jitter buffer.

In another embodiment the apparatus is adapted to obtain a maximum packet-hold time value for a first UE, wherein the obtained maximum packet-hold time value for the first UE was determined based on environment data associated with the first UE and a model obtained by a supervised learning process. This apparatus is further adapted to receive, at time t1, a packet obtained by an upstream device at time t0. This apparatus is further adapted to store the received packet in a de-jitter buffer, and, after storing the packet in the de-jitter buffer, transmit the packet at a predetermined time t that is based on the obtained maximum packet-hold time value for the first UE.

In some embodiment, the apparatuses described above comprises processing circuitry and a storage device storing a computer program.

BRIEF DESCRIPTION OF THE DRAWINGS

The accompanying drawings, which are incorporated herein and form part of the specification, illustrate various embodiments.

DETAILED DESCRIPTION

Figure 1:
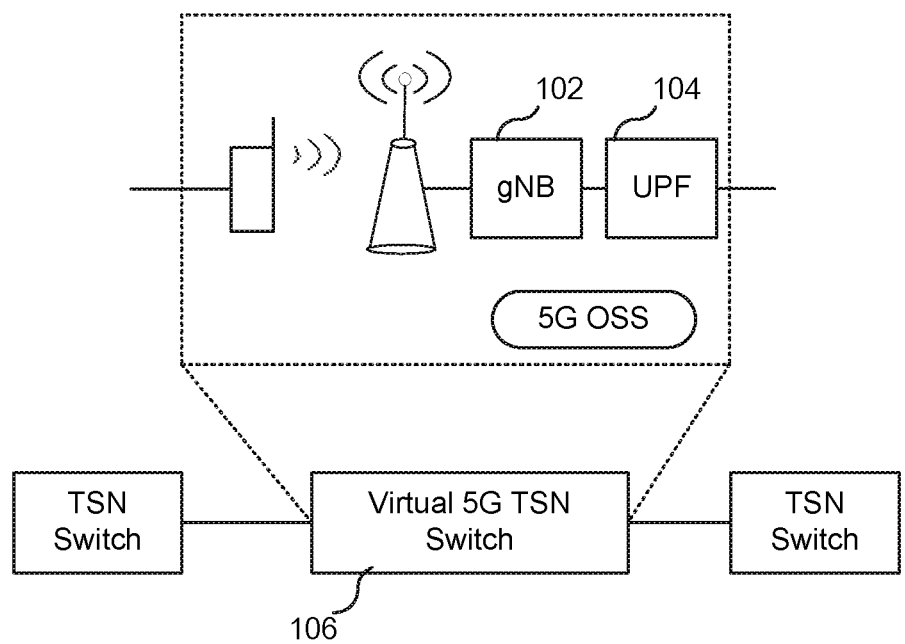
FIG. 1 illustrates how TSN can be integrated with a wireless network.
Figure 2:
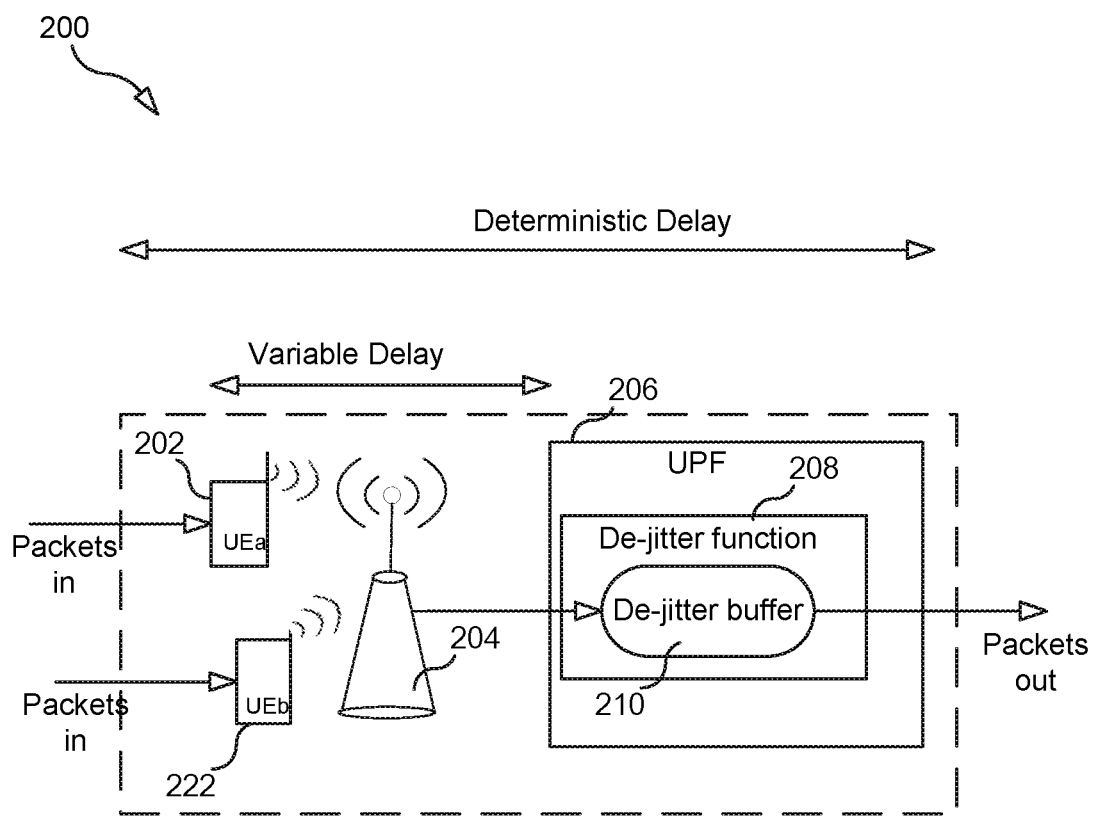
FIG. 2 illustrates a system according to an embodiment.

FIG. 2 illustrates a system 200 according to an embodiment in which a de-jitter function is a component of a UPF. However, as noted above, a de-jitter function may be located in other devices (e.g., a user equipment). System 200 includes user equipments (UEs) 202 and 222, which are devices capable of wireless communication with an access point (e.g. access point 204) (e.g., a 3GPP base station, such as, for example, a 3GPP 5G base station (gNB)). Each of UEs 202 and 222 may be a controller (or a component of a controller) that is used to control equipment in a factory.

Access point 204 is communicatively connected to a user plane function (UPF) 206 (e.g., a gateway, a switch). UPF 206 includes a de-jitter function 208 that employs a de-jitter buffer 210 to hold packets received from access point 204 for the purpose of removing jitter from a stream of packets. Each of UEs 202 and 222 obtain packets (e.g., generate packets or receive packets from another device, such as, for example, a TSN device) and wirelessly forward the obtained packets. In the example, shown both UE 202 and UE 222 forward their obtained packets to UPF 206 via access point 204. However, in other embodiments UEs 202 and 222 may communicate with UPF 206 via different access points. Still in other embodiments, UE 202 may communicate with UPF 206 via access point 204 while UE 222 communicates with a different UPF via a different access point.

Figure 3:
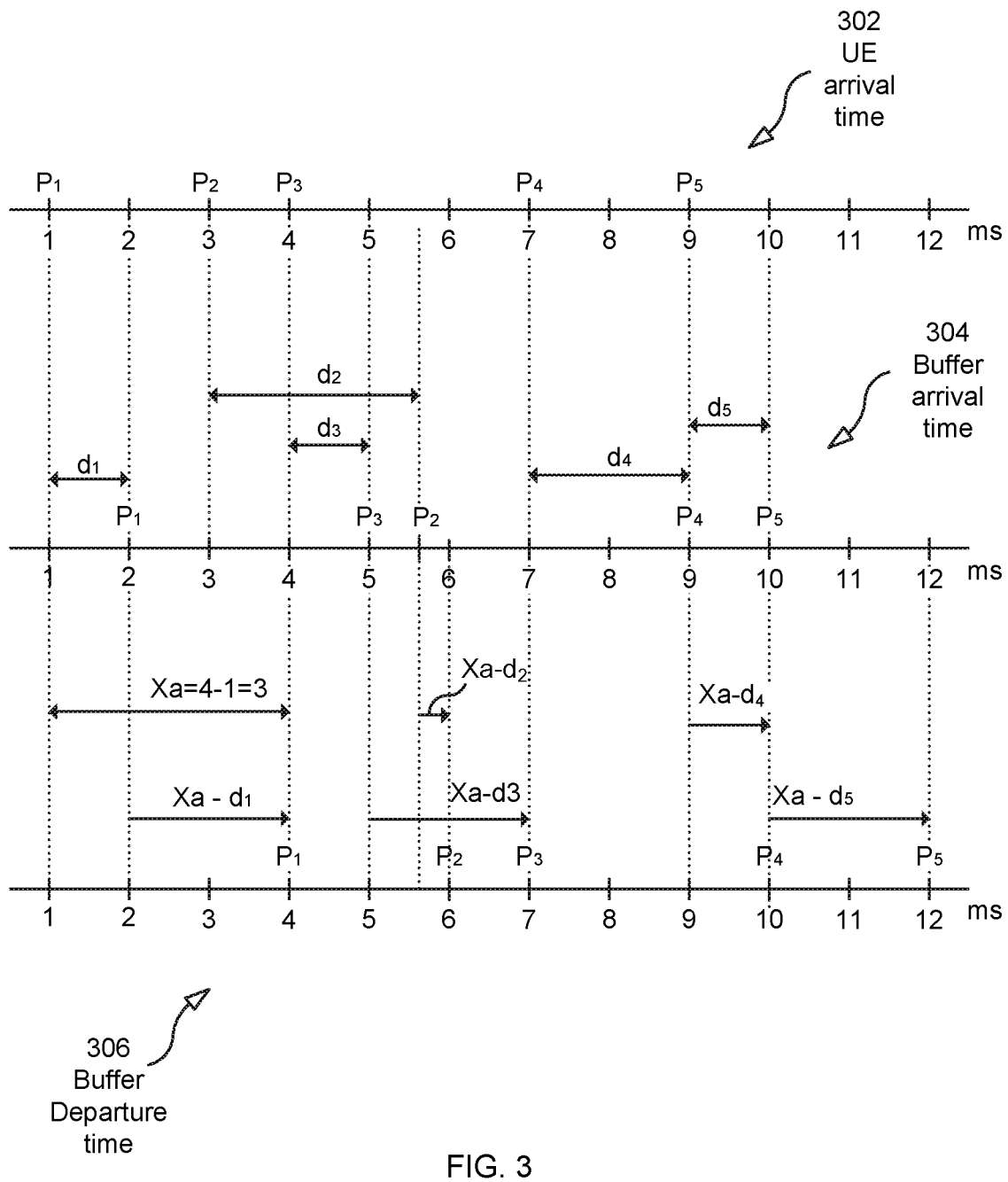
FIG. 3 is an example a packet timing diagram.

FIG. 3 illustrates an example packet timing diagram, which illustrates a fluctuation in UL packet latencies (i.e., packets transmitted by UE 202). The top timeline 302 illustrates the times at which each packet in a sequence of packets (i.e., packets P1 to P5) are obtained (e.g., received or generated) by UE 202 (these are referred to as the "UE Arrival Times"). In some embodiments, UE 202 is a component of a device (e.g., a robot control device) and another component of the device (e.g., a controller) generates the sequence of packets and provides the packets to UE 202 (i.e., UE 202 receives the packets generated by the other component of the device). In such an embodiment, the UE Arrival Time may be the time at which these packets generated by the other component are received at UE 202.

The middle timeline 304 illustrates the times at which packets P1 to P5 are received at UPF 206 (these are referred to as the "Buffer Arrival Times"). And the bottom time line 306 illustrates the times at which packets P1 to P5 are forwarded by the UPF 206 to the next device (e.g., TSN switch, controller, etc.) (these are referred to as the "Buffer Departure Times").

As FIG. 3 demonstrates, there is a variable latency between UE 202 and UPF 206 because some packets transmitted by UE 202 to UPF 206 are delayed more than other packets. For instance, packet P2 experienced a delay of d2, whereas packet P3 only experienced a delay of d3 (d3<d2). Accordingly, the sequence of packets experiences jitter.

Figure 4:
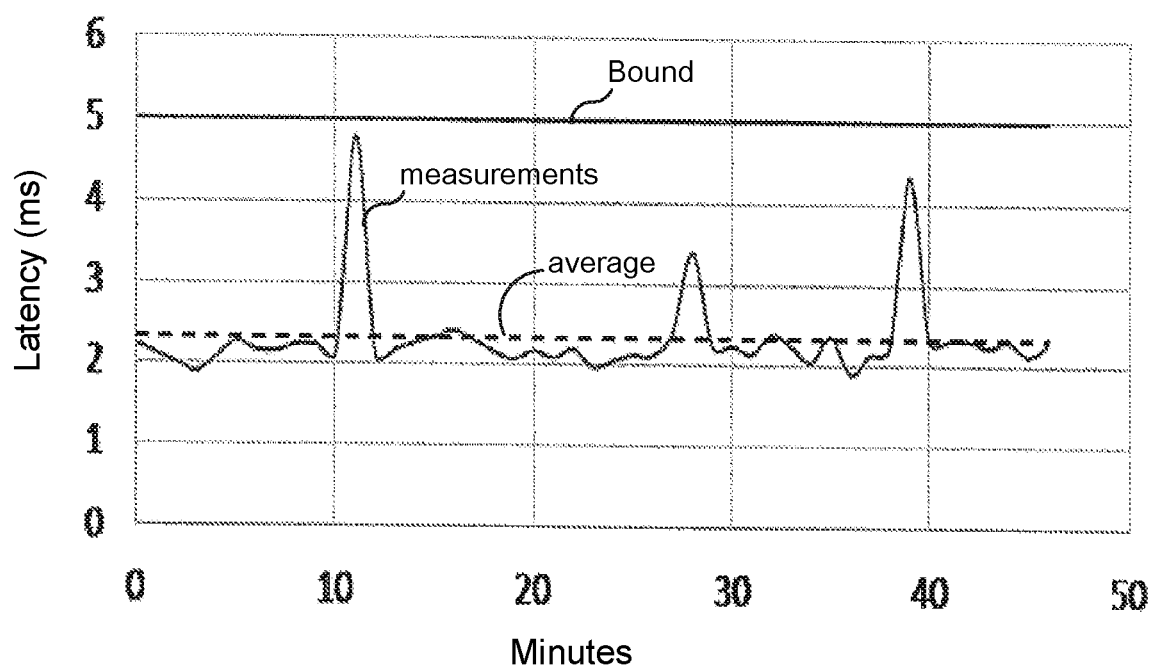
FIG. 4 is a graph that illustrates example latencies.

The same holds true for UE 222. That is, there is a variable latency between UE 222 and UPF 206. But the variable latency between UE 202 and UPF 206 may be different from the variable latency between UE 222 and UPF 206. For example, the maximum latency between UE 202 and UPF 206 may be smaller than the maximum latency between UE 222 and UPF 206. For example, FIG. 4. shows the variable latency between UE 222 and UPF 206 over time. As shown in FIG. 4, the latency of the packets forwarded through the network fluctuates over time. The dashed line shows a mean value of all latency samples. A maximal latency spike in this data set is around 4.8 ms, whereas for the data shown in FIG. 3 the maximal latency (i.e., d2) is almost 3 ms.

To remove the jitter and thereby provide a deterministic latency, UPF 206 utilizes de-jitter function 208, which i) employs de-jitter buffer 210 to hold each packet for a certain amount of time and ii) then forwards the packet when the certain amount of time has elapsed.

As FIG. 3 indicates, in one embodiment, the amount of time that each packet originating from UE 202 (which we will now refer to a UEa) is held in the de-jitter buffer 201, which is referred to as the packet-hold time for UE 202, is a function of Xa, where Xa is the maximum packet-hold time for UEa (i.e., the agreed upon latency for UEa). The maximum packet-hold time is based on the worst-case scenario—the maximum latency. Typically, Xa is large enough so that 99.99999% packets are ensured to go through without dropping (packet loss). At the same time, Xa should be as small as possible.

Referring back to FIG. 3, in the embodiment shown, de-jitter function 208 holds packet i for an amount of time that is equal to: Xa−di, where di is the amount of delay experienced by packet i (i={1,2,3,4,5}) and Xa is equal to 3 ms for this example. Thus, for example, the packet-hold time for packet P3 is Xa−d3 (i.e., 3−1=2, in this example), while the packet-hold time for packet P2 is Xa−d2 (i.e. 3−2.7=0.3). In one embodiment, de-jitter function 208 determines di for packet Pi based on timing information included in or with the packet. For example, packet Pi may include a header that includes a timestamp that identifies packet Pi's UE Arrival Time. In such an embodiment, de-jitter function 208 is able to determine di because de-jitter function 208 knows the Buffer Arrival Time and di=Pi's Buffer Arrival Time−Pi's UE Arrival Time.

In another embodiment, de-jitter function 208 holds an initial packet (i.e., P1) for an amount of time equal to Xa, and, for each subsequent packet Pi (i=2, 3, 4, . . . ) de-jitter function 208 hold the packet Pi for amount of time equal to: $Delta_i-(BA_i-BD_{i-1})$, where $Delta_i$ is equal to Pi's UE Arrival time minus Pi−1's UE Arrival Time (i.e. the time spacing between packet Pi and Pi−1), $BA_i$ is Pi's Buffer Arrival Time, and $BD_{i-1}$ is packet Pi−1's Buffer Departure Time. Delta may be a pre-determined constant known to de-jitter function or Delta may be obtained from timing information contained in the packet or transmitted with the packet. For example, in some embodiments $Delta_i=C$ for i=1, 2, 3, . . . , where C is a known constant.

While FIG. 3 illustrates a scenario for UEa, the same applies to UEb (i.e., UE 222) because, as noted in FIG. 4, the packets originating from UEb also experience a variable latency as they traverse the network to the UPF. Accordingly, in one embodiment, de-jitter function 208 holds packet i originating from UEb for an amount of time that is equal to: Xb−di. Alternatively, as noted above, in another embodiment de-jitter function 208 holds an initial packet originating from UEb for an amount of time equal to Xb, and, for each subsequent packet Pi de-jitter function 208 hold the packet for amount of time equal to: $Delta_i-(BA_i-BD_{i-1})$.

In the de-jitter solution described above, the de-jitter function 208 holds received UL packets for a certain amount of time so that the agreed fixed latency (e.g., Xa, Xb) is achieved and jitter is avoided (i.e., the pace of outgoing packets can be made equal to the pace of incoming packets). The same principle applies to DL packets, in which case a de-jitter function just like de-jitter function 208 may be a component of UEa and UEb. Accordingly, for each packet (UL or DL) received at the de-jitter function, the de-jitter function may delay the forwarding of the packet (i.e., not forward the packet immediately upon receiving the packet) so that the packet will have a total delay equal to the desired packet delay (i.e., the agreed fixed latency). The desired packet delay is a function of maximum latency (e.g., it is usually equal to or greater than the maximum latency that may occur when a packet is forwarded through the wireless network). That is, to ensure that packets are not dropped, Xa and Xb should be at least as large as the maximal latency.

One approach is to assume a single worst case scenario (e.g., a single maximal latency) that applies for all UEs, and, therefore, set Xa=X and Xb=X, where X is a function of this assumed single maximal latency. However, in situations where a sequence of packets from UEa has a lower maximal latency than a sequence of packets from UEb, assuming a single maximal latency is not an optimal approach because the packets from UEa will be buffered longer than they need to be.

For example, it may very well be possible that the worst case occurs only for a single UE or a subset of the UEs. For example, at least some packets transmitted by UEb may experience a greater delay than any packet transmitted by UEa due to the physical position of UEb. Thus, it may be the case that, for a particular group of UEs, the radio channel between the UEs in the group and the serving base station has a good quality. Accordingly, packets transmitted from these UEs don't need to be held in the de-jitter buffer based on the worst-case scenario. Because holding a packet in a de-jitter buffer adds undesired and unnecessary latency to the overall communication system, it is desirable to minimize the amount of time a packet is held in a de-jitter buffer, while at the same time removing the jitter.

A solution to the problem above is to customize the maximum packet-hold time (agreed fixed latency) for each UE (or each group of UEs) rather than apply a single maximum packet-hold time for all UEs, thereby achieving a shorter latency for the UEs that do not need to be configured for the worst-case scenario (e.g., the UEs that experience a good radio channel quality). This customization of the maximum packet-hold-time can be achieved using a model (e.g., a mathematical function, a table, algorithm, etc.) that maps environment data for a UE to an optimal maximum packet-hold-time for the UE. For example, a machine learning functionality can find patterns such that the maximum packet-hold time for each UE can be kept as low as possible. For example, all UEs in the left corner of a production facility may receive a good radio signal, which means that the risk for jitter is low for these UEs, and, consequently, the maximum packet-hold time for these UEs can be set to a lower value than the maximum packet-hold-time that is set for other UEs (e.g., UES in a different part of the facility) that do not experience such a good radio signal. An advantage is that the de-jitter function is "intelligent" because it does not simply set a default worst-case maximum packet-hold-time for all (or a group of) UEs. Another advantage of this is that memory consumption and energy consumption for the unit hosting the de-jitter function can be improved.

Using Machine Learning to Set a Maximum Packet-Hold Time for a UE

Assuming that there exists a database that stores the UE Arrival Times and the Buffer Arrival Times for a large set of packets originating from a particular UE (UEi) (e.g., a complete day of traffic), it is straightforward to discern the maximal latency and thus straightforward to determine the maximum packet-hold (Xi) time for UEi.

A disadvantage of such approach is that it provides the maximum packet-hold time after packet timing data is collected for a period of time (e.g. a day). A better approach is to obtain (e.g., generate, create, get, receive) a model that predicts the optimal maximum packet-hold time based for UEi based on UEi's environment data that can be observed in advance. An underlying assumption is that jitter for UEi is dependent on UEi's environment. Environmental data may include information elements like a vector with the UE's physical location (or physical location over time if the UE is moving), characteristics of the UE's traffic pattern, characteristics of the device hosting the UE, etc.

One way to obtain a model that predicts the optimal maximum packet-hold time based for UEi based on UEi's environment data is to use machine learning (e.g., use a supervised learning model). To train the supervised-learning model, training data is needed. In this case the training data includes, for each UE included in a "training" set of UEs, environment data for the UE (input) and the determined optimal maximum packet-hold time for the UE (output). The training data is input to supervised-learning model so that the model can determine a relationship between the input (environment data) and the output (optimal max packet-hold time). Once the model is trained, the model can be used find the optimal max packet-hold time for UEs that were not used in the training phase. An advantage of this approach is that an optimal max packet-hold time can be found quickly. That is, one can predict for UEi the optimal max packet-hold time for the UE (Xi) based on historical data from many other UEs.

Figure 5:
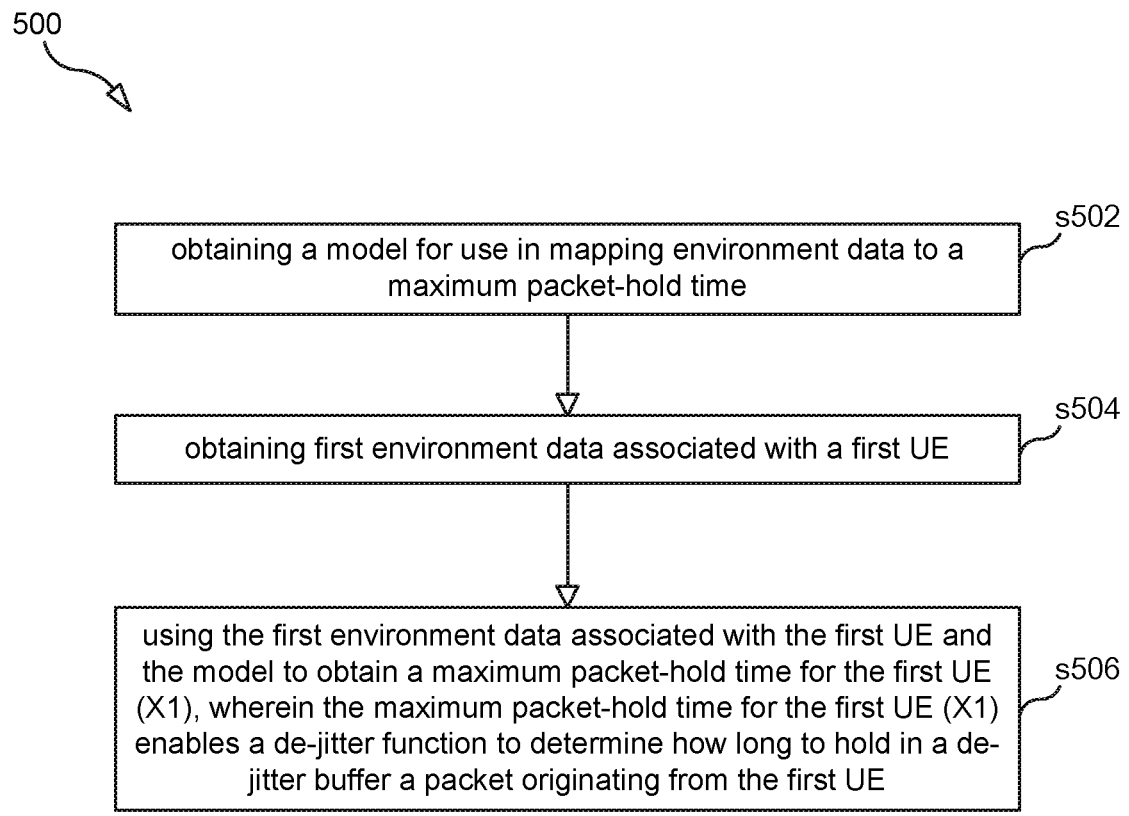
FIG. 5 is a flow chart illustrating a process according to an embodiment.

FIG. 5 is a flowchart illustrating a process 500 according to an embodiment. Process 500 may begin in step s502. Step s502 comprises obtaining a model for use in mapping environment data to a maximum packet-hold time. Step s504 comprises obtaining first environment data associated with a first UE (e.g., UE 202). Step s506 comprises using the first environment data associated with the first UE and the model to obtain a maximum packet-hold time for the first UE (i.e., obtain X1), wherein X1 enables a de-jitter function to determine how long to hold an UL or DL packet in a de-jitter buffer (e.g., an UL packet originating from the first UE or a DL packet received at the first UE).

In some embodiments, the environment data associated with the first UE comprises location information identifying the current location of the first UE.

In some embodiments, the UE is hosted in a device, and the environment data associated with the first UE further comprises device characteristic information indicating a characteristic of a device hosting the UE.

In some embodiments, the method also includes: receiving, at time t1, a packet having a UE Arrival time of t0; storing the received packet in the de-jitter buffer; and after storing the packet in the de-jitter buffer, transmitting the packet at a predetermined time t that is based on X1. In some embodiments, t=X1−(t1−t0). In other embodiments, t=t1+X1. In some embodiments, process 500 also includes determining the value of t0 based on timing information contained in the packet or timing information transmitted with the packet.

In some embodiments, process 500 also includes obtaining second environment data associated with a second UE (e.g. UE 222); and using the second environment data associated with the second UE and the model to obtain a maximum pack-hold-time for the second UE (X2).

Figure 6:
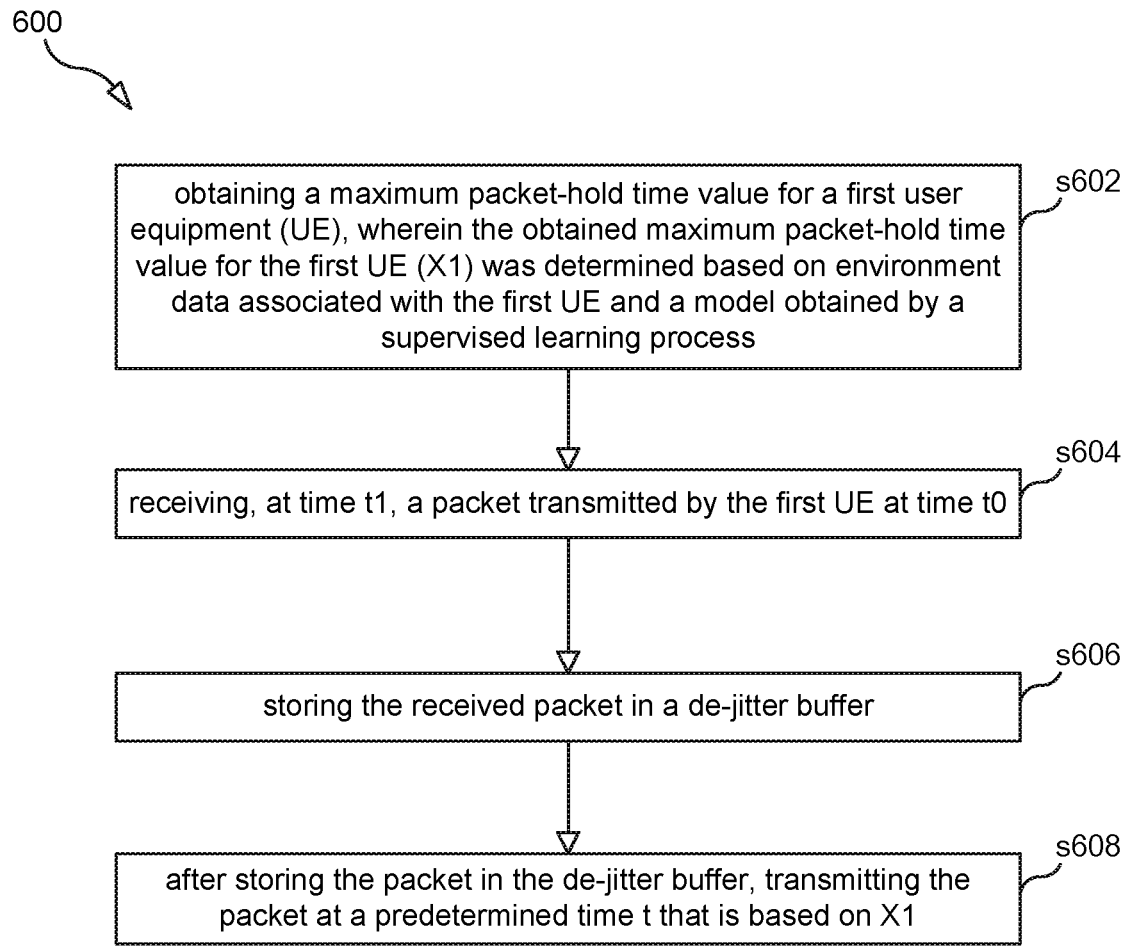
FIG. 6 is a flow chart illustrating a process according to an embodiment.

FIG. 6 is a flowchart illustrating a process 600 according to an embodiment. Process 600 may begin in step s602. Step s602 comprises obtaining a maximum packet-hold time value for a first UE (e.g. UE 202), wherein the obtained maximum packet-hold time value for the first UE (X1) was determined based on environment data associated with the first UE and a model obtained by a supervised learning process. Step s604 comprises receiving, at time t1, a packet obtained by the first UE at time t0. Step s606 comprises storing the received packet in a de-jitter buffer. And steps s608 comprises, after storing the packet in the de-jitter buffer, transmitting the packet at a predetermined time t that is based on X1 (e.g., t=X1−(t1−t0) or t=t1+X1). In some embodiments, the value t0 is determined based on timing information contained in the packet or timing information transmitted with the packet.

Figure 7:
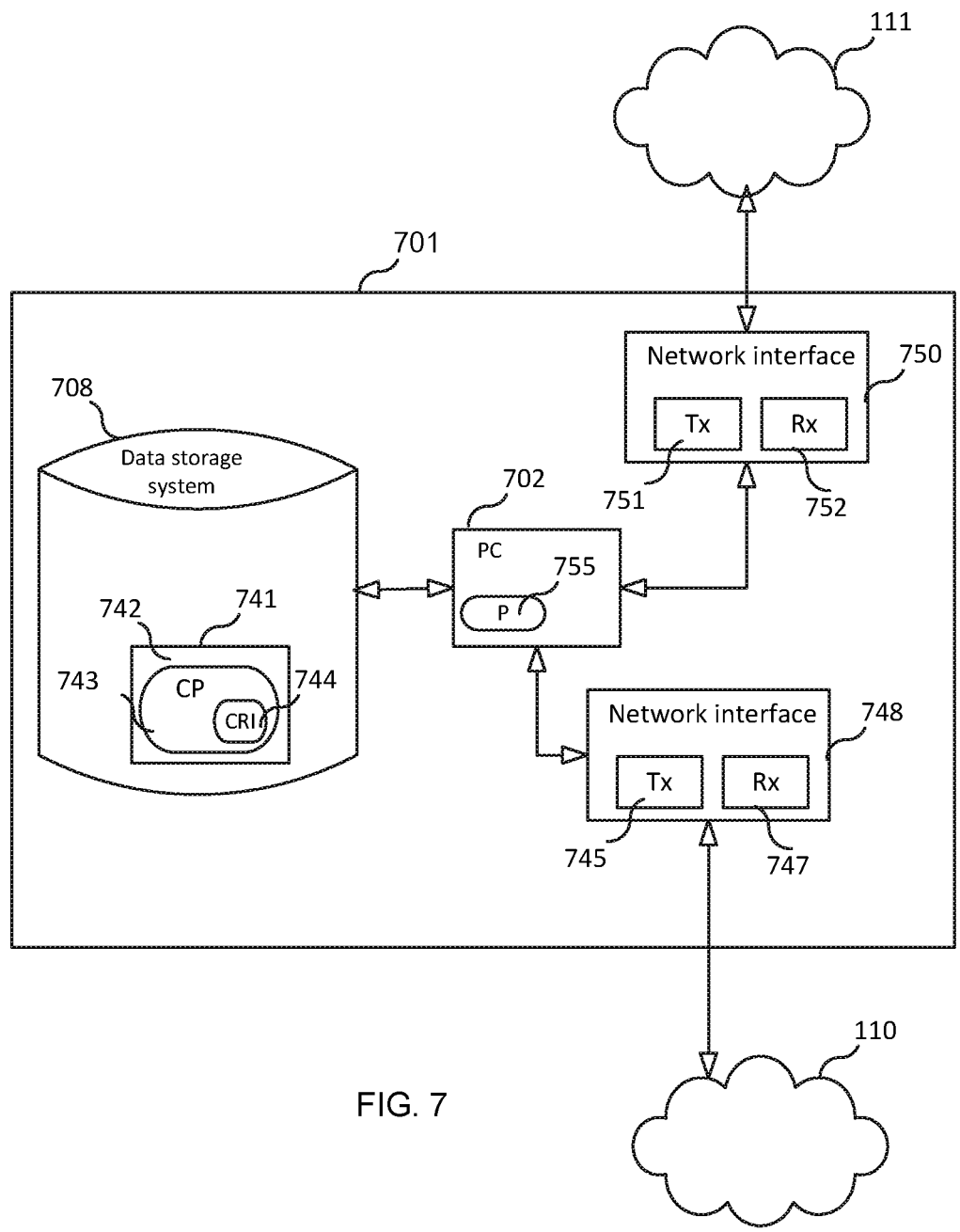
FIG. 7 is a block diagram of an apparatus according to one embodiment.

FIG. 7 is a block diagram of an apparatus 701 for implementing UPF 206 or a UE, according to some embodiments. As shown in FIG. 7, apparatus 701 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a first network interface 748 comprising a transmitter (Tx) 745 and a receiver (Rx) 747 for enabling apparatus 701 to transmit data to and receive data from other nodes connected to a network 110 (e.g., an Internet Protocol (IP) network) to which network interface 748 is connected; a second network interface 750 comprising a transmitter (Tx) 751 and a receiver (Rx) 752 for enabling apparatus 701 to transmit data to and receive data from other nodes connected to a network 111 to which network interface 750 is connected; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes apparatus 701 to perform steps described herein (e.g., steps described herein with reference to the flow charts). In other embodiments, apparatus 701 may be configured to perform steps described herein without the need for code. That is, for example, PC 702 may consist merely of one or more ASICs. Hence, the features of the embodiments described herein may be implemented in hardware and/or software.

Summary of the Various Embodiments

A1. A method, comprising: obtaining a model for use in mapping environment data to a maximum packet-hold time; obtaining first environment data associated with a first user equipment (UE) (202); and using the first environment data associated with the first UE and the model to obtain a maximum packet-hold time for the first UE (X1), wherein the maximum packet-hold time for the first UE (X1) enables a de-jitter function to determine how long to hold an UL or DL packet in a de-jitter buffer (e.g., an UL packet originating from the first UE or a DL packet received at the UE).

A2. The method of embodiment A1, wherein the environment data associated with the first UE comprises location information identifying the current location of the first UE.

A3. The method of embodiment A2, wherein the UE is hosted in a device, and the environment data associated with the first UE further comprises device characteristic information indicating a characteristic of a device hosting the UE.

A4. The method of any one of embodiments A1-A3, further comprising: receiving, at time t1, a packet obtained by the first UE at time t0; storing the received packet in the de-jitter buffer; and after storing the packet in the de-jitter buffer, transmitting the packet at a predetermined time t that is based on the obtained maximum packet-hold time for the first UE (X1).

A5. The method of embodiment A4, wherein t=X1−(t1−t0).

A6. The method of embodiment A5, further comprising determining the value of t0 based on timing information contained in the packet or timing information transmitted with the packet.

A7. The method of embodiment A4, wherein t=t1+X1.

A8. The method of any one of embodiments A1-A7, further comprising: obtaining second environment data associated with a second UE (222); and using the second environment data associated with the second UE and the model to obtain a maximum pack-hold-time for the second UE (X2).

B1. A method, comprising: obtaining a maximum packet-hold time value for a first user equipment (UE), wherein the obtained maximum packet-hold time value for the first UE (X1) was determined based on environment data associated with the first UE and a model obtained by a supervised learning process; receiving, at time t1, a packet obtained by an upstream device at time t0 (e.g., obtained by the first UE for UL packets or obtained by the UPF for DL packets); storing the received packet in a de-jitter buffer; and after storing the packet in the de-jitter buffer, transmitting the packet at a predetermined time t that is based on the obtained maximum packet-hold time value for the first UE (X1).

B2. The method of claim B1, wherein t=X1−(t1−t0).

B3. The method of embodiment B1 or B2, further comprising determining the value of t0 based on timing information contained in the packet or timing information transmitted with the packet.

B4. The method of embodiment B1, wherein t=X1+t1.

B5. The method of any one of embodiments B1-B4, wherein the environment data associated with the first UE comprises location information identifying the current location of the first UE.

B6. The method of embodiment B5, wherein the UE is hosted in a device, and the environment data associated with the first UE further comprises device characteristic information indicating a characteristic of a device hosting the UE.

C1. An apparatus (701) adapted to perform the method of any one of embodiments A1-A8 and B1-B6.

D1. A computer program comprising instructions for adapting an apparatus to perform the method of any one of embodiments A1-A8 and B1-B6.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, comprising:
   obtaining a model for use in mapping environment data to a maximum packet-hold time;
   obtaining environment data associated with a first user equipment (UE), wherein
   the environment data associated with the first UE comprises location information identifying the current location of the first UE; and
   using at least the location information of the first UE and the model to obtain a maximum packet-hold time for the first UE, wherein the maximum packet-hold time for the first UE enables a de-jitter function to determine how long to hold an uplink (UL) or downlink (DL) packet in a de-jitter buffer.

2. The method of claim 1, wherein
   the UE is hosted in a device,
   the environment data associated with the first UE further comprises device characteristic information indicating a characteristic of a device hosting the first UE, and
   at least the device characteristic information, the location information, and the model are used to obtain the maximum packet-hold time for the first UE.

3. The method of claim 1, further comprising:
   receiving, at time t1, a packet obtained by the first UE at time t0;
   storing the received packet in the de-jitter buffer; and
   after storing the packet in the de-jitter buffer, transmitting the packet at a predetermined time t that is based on the obtained maximum packet-hold time for the first UE.

4. The method of claim 3, wherein $t=X1-(t1-t0)$, where X1 is the obtained maximum packet-hold time for the first UE.

5. The method of claim 4, further comprising determining the value of t0 based on timing information contained in the packet or timing information transmitted with the packet.

6. The method of claim 3, wherein $t=t1+X1$, where X1 is the obtained maximum packet-hold time for the first UE.

7. The method of claim 1, further comprising:
   obtaining second environment data associated with a second UE; and
   using the second environment data associated with the second UE and the model to obtain a maximum pack-hold-time for the second UE.

8. The method of claim 1, wherein
   using at least the location information of the first UE and the model to obtain a maximum packet-hold time for the first UE comprises using the location information of the first UE, the model, and device characteristic information indicating traffic patterns of the first UE to obtain the maximum packet-hold time for the first UE.

9. A method, comprising:
   obtaining a maximum packet-hold time value for a first user equipment (UE), wherein the obtained maximum packet-hold time value for the first UE was determined based on environment data associated with the first UE and a model obtained by a supervised learning process;
   receiving, at time t1, a packet obtained by an upstream device at time t0;
   storing the received packet in a de-jitter buffer; and
   after storing the packet in the de-jitter buffer, transmitting the packet at a predetermined time t that is based on the obtained maximum packet-hold time value for the first UE.

10. The method of claim 9, wherein $t=X1-(t1-t0)$, where X1 is the obtained maximum packet-hold time value for the first UE.

11. The method of claim 9, further comprising determining the value of t0 based on timing information contained in the packet or timing information transmitted with the packet.

12. The method of claim 9, wherein $t=X1+t1$, where X1 is the obtained maximum packet-hold time value for the first UE.

13. The method of claim 9, wherein the environment data associated with the first UE comprises location information identifying the current location of the first UE.

14. The method of claim 13, wherein
    the UE is hosted in a device, and
    the environment data associated with the first UE further comprises device characteristic information indicating a characteristic of a device hosting the UE.

15. The method of claim 9, wherein the environment data associated with the first UE comprises location information identifying locations of the first UE over a period of time.

16. A computer program product comprising a non-transitory computer readable medium storing a computer program comprising instructions which when executed by processing circuitry causes the processing circuitry to perform the method of claim 1.

17. An apparatus, the apparatus being adapted to:
    obtain a model for use in mapping environment data to a maximum packet-hold time;
    obtain first environment data associated with a first user equipment (UE), wherein
    the environment data associated with the first UE comprises location information identifying the current location of the first UE; and
    use at least the location information of the first UE and the model to obtain a maximum packet-hold time for the first UE, wherein the maximum packet-hold time for the first UE enables a de-jitter function to determine how long to hold an uplink (UL) or downlink (DL) packet in a de-jitter buffer.

18. The apparatus of claim 17, wherein the apparatus comprises processing circuitry and a storage device storing a computer program.

19. An apparatus, the apparatus being adapted to:
    obtain a maximum packet-hold time value for a first user equipment (UE), wherein the obtained maximum packet-hold time value for the first UE was determined based on environment data associated with the first UE and a model obtained by a supervised learning process;
    receive, at time t1, a packet obtained by an upstream device at time t0;
    store the received packet in a de-jitter buffer; and
    after storing the packet in the de-jitter buffer, transmit the packet at a predetermined time t that is based on the obtained maximum packet-hold time value for the first UE.

20. The apparatus of claim 19, wherein the apparatus comprises processing circuitry and a storage device storing a computer program.

* * * * *